(12) United States Patent
Tweet et al.

(10) Patent No.: US 12,258,891 B2
(45) Date of Patent: *Mar. 25, 2025

(54) MUFFLER ASSEMBLIES FOR SNOWMOBILES

(71) Applicant: Arctic Cat Inc., Thief River Falls, MN (US)

(72) Inventors: Jeffrey T. Tweet, Thief River Falls, MN (US); David L. Vigen, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,061

(22) Filed: Jan. 31, 2024

(65) Prior Publication Data

US 2024/0167414 A1 May 23, 2024

Related U.S. Application Data

(63) Continuation of application No. 18/206,718, filed on Jun. 7, 2023, now Pat. No. 11,927,121.

(60) Provisional application No. 63/404,731, filed on Sep. 8, 2022.

(51) Int. Cl.
*F01N 13/08* (2010.01)
*B62D 55/07* (2006.01)

(52) U.S. Cl.
CPC .............. *F01N 13/08* (2013.01); *B62D 55/07* (2013.01)

(58) Field of Classification Search
CPC ...... F01N 2590/04; F01N 3/05; F01N 3/2885; F01N 1/14; F01N 2270/02; F01N 2260/20; F01N 2260/022; F01N 13/0097; F01N 2270/06; F01N 2470/30; F01N 13/141; F01N 2510/00

See application file for complete search history.

(56) References Cited

U.S. PATENT DOCUMENTS

| | | |
|---|---|---|
| 2,121,319 A | 6/1938 | Fluor, Jr. et al. |
| 2,138,001 A | 11/1938 | Fluor, Jr. |
| 3,773,127 A | 11/1973 | Aaen et al. |
| 3,779,327 A | 12/1973 | Pereault |
| 3,795,287 A | 3/1974 | Rose |
| 4,060,985 A * | 12/1977 | Fukushima ............. B27B 17/00 181/259 |

(Continued)

FOREIGN PATENT DOCUMENTS

| | | |
|---|---|---|
| JP | S55125312 A | 9/1980 |
| JP | 2009275659 A | 11/2009 |

*Primary Examiner* — Anthony Ayala Delgado
(74) *Attorney, Agent, or Firm* — Lawrence Youst PLLC

(57) ABSTRACT

An exhaust system for a snowmobile includes a muffler housing, the bottom end of the muffler housing including a muffler exhaust outlet configured to emit exhaust. The exhaust system includes a muffler housing cover spaced from the muffler housing to define an airflow channel therebetween, the muffler housing cover forming a bottom opening. The exhaust system also includes a gas combiner at least partially surrounding the muffler exhaust outlet on the bottom end of the muffler housing and extending through the bottom opening of the muffler housing cover. The gas combiner receives air from the airflow channel and the exhaust from the muffler exhaust outlet to emit a combined air-exhaust stream.

18 Claims, 12 Drawing Sheets

(56) References Cited

U.S. PATENT DOCUMENTS

| | | | |
|---|---|---|---|
| 4,265,332 A | | 5/1981 | Presnall et al. |
| 4,940,100 A | | 7/1990 | Ueda |
| 5,029,668 A | | 7/1991 | Murakawa et al. |
| 5,689,953 A | * | 11/1997 | Yamashita ................ F01N 3/05 |
| | | | 180/68.1 |
| 6,419,533 B2 | | 7/2002 | Lecours |
| 7,296,657 B2 | | 11/2007 | Ohno et al. |
| 7,374,016 B2 | | 5/2008 | Yamaguchi et al. |
| 8,028,795 B2 | | 10/2011 | Hisanaga et al. |
| 10,196,948 B2 | | 2/2019 | Masui et al. |
| 11,384,679 B2 | | 7/2022 | Matsumoto et al. |
| 2010/0122682 A1 | | 5/2010 | Hisanaga et al. |
| 2012/0124980 A1 | | 5/2012 | Prenger et al. |
| 2021/0108551 A1 | | 4/2021 | Young et al. |
| 2021/0115835 A1 | | 4/2021 | Diehl et al. |

* cited by examiner

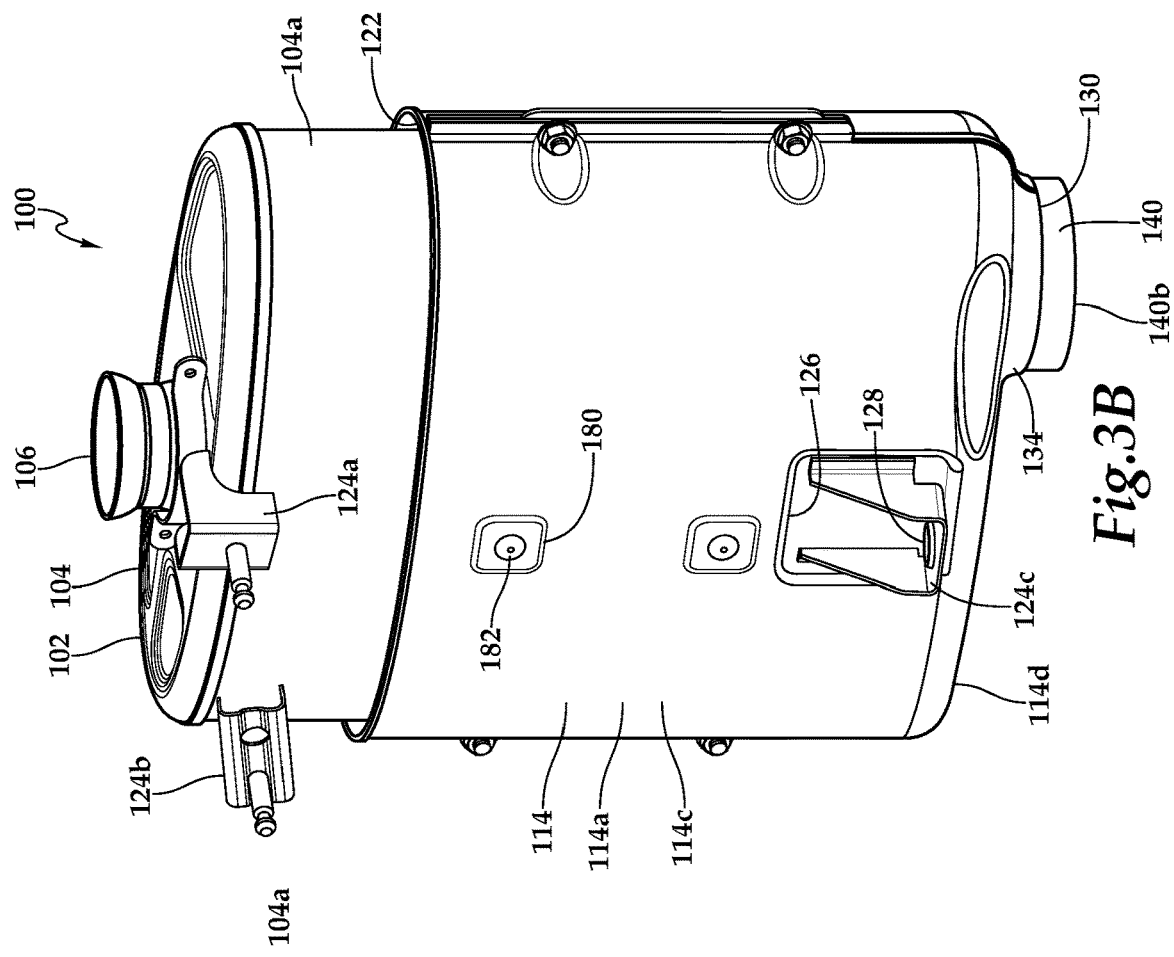
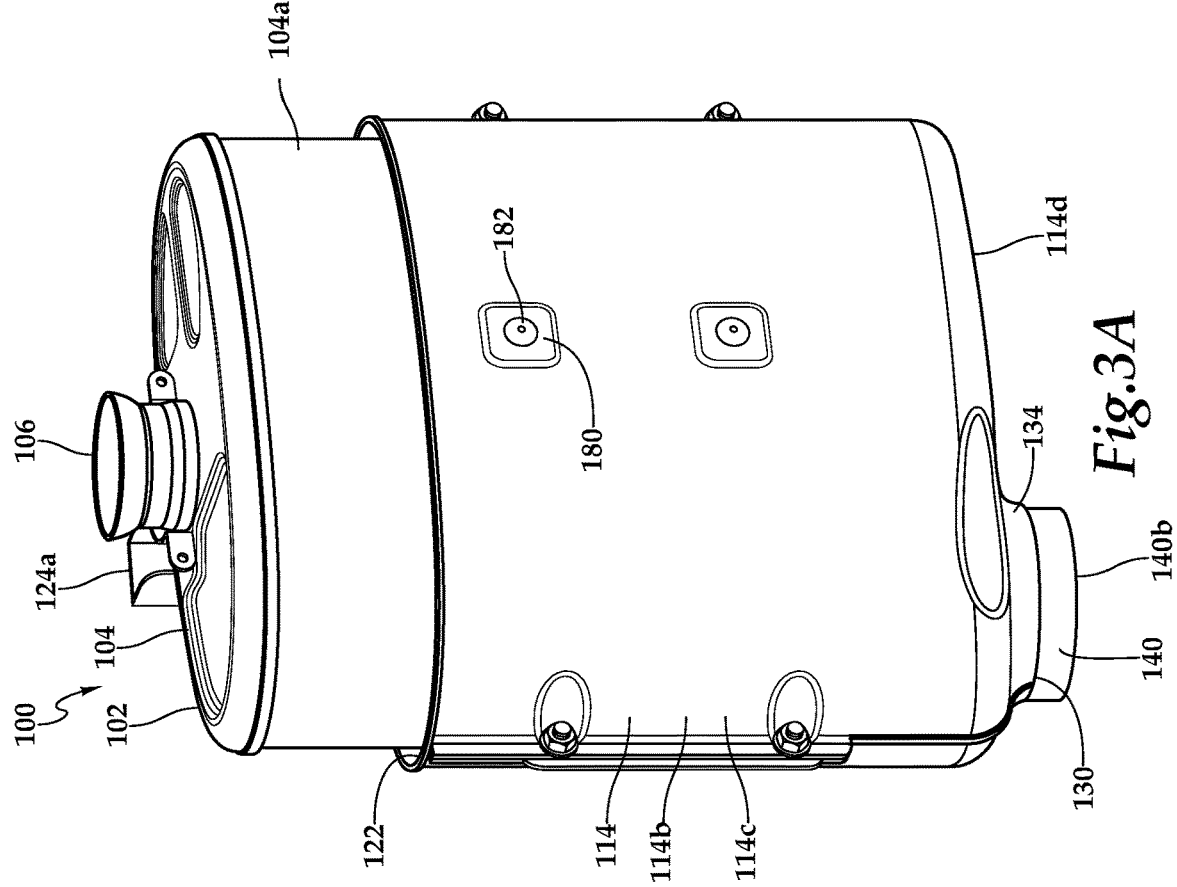

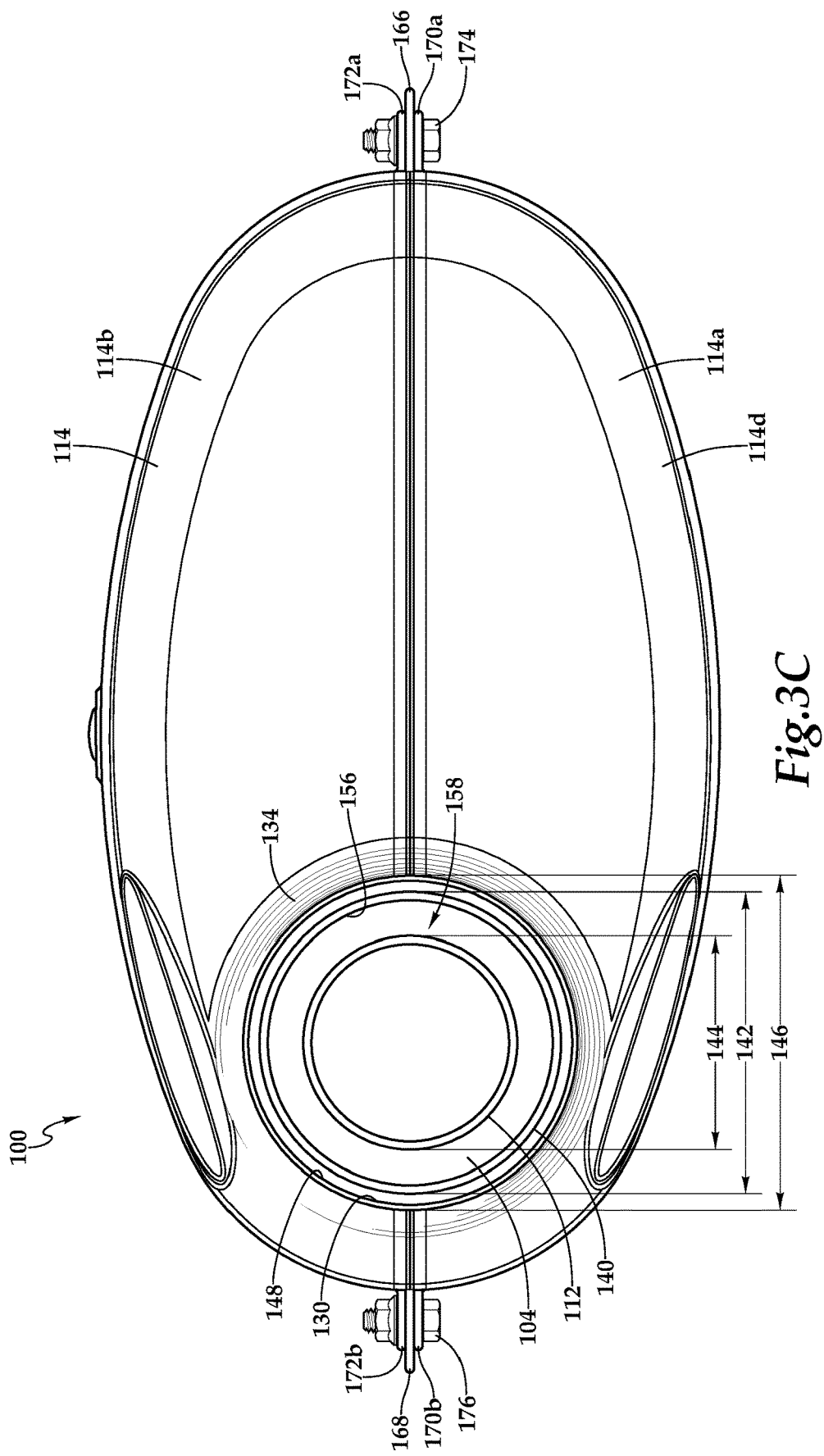

MUFFLER ASSEMBLIES FOR SNOWMOBILES

CROSS-REFERENCE TO RELATED APPLICATIONS

The present application is a continuation of co-pending application Ser. No. 18/206,718, filed Jun. 7, 2023, which claims the benefit of provisional application No. 63/404,731, filed Sep. 8, 2022, the entire contents of each are hereby incorporated by reference.

TECHNICAL FIELD OF THE DISCLOSURE

The present disclosure relates, in general, to exhaust systems for use on land vehicles and, in particular, to muffler assemblies for use on snowmobiles that include an airflow channel and a gas combiner that combine exhaust emitted from the muffler with air from the airflow channel to form an air-exhaust stream that is configured to transfer heat away from the muffler.

BACKGROUND

Snowmobiles are popular land vehicles used for transportation and recreation in cold and snowy conditions. Certain snowmobiles are designed for specific applications such as deep snow, high performance, luxury touring and trail riding. Snowmobiles typically include a forward frame assembly that supports various components of the snowmobile such as a ground-engaging endless drive track disposed in a longitudinally extending drive tunnel. The drive track is powered by an engine that enables the drive track to provide ground propulsion for the snowmobile. One or more skis serve to facilitate steering as well as to provide flotation of the front of the snowmobile over the snow. The forward frame assembly is covered by exterior body panels that enclose a forward internal compartment of the snowmobile in which various mechanical components reside including high-temperature components such as the exhaust system.

The exhaust system of a snowmobile directs high-temperature exhaust away from the engine and emits the exhaust out of a forward internal compartment. The exhaust system includes a muffler that is prone to high operating temperatures as a result of the high-temperature exhaust flowing therethrough, which can drastically increase the temperature within the forward internal compartment. In current snowmobiles, the various systems in the forward internal compartment are often densely packed to reduce the size and improve the aerodynamics and handling of the snowmobile. Temperature-sensitive components near the muffler in the forward internal compartment such as plastic or electrical components may be negatively impacted by the high temperature of the muffler. Spacing such temperature-sensitive components farther from the muffler requires a larger forward internal compartment, which adversely affects the aerodynamics and handling of the snowmobile.

While attempts have been made to reduce the temperature of the forward internal compartment by thermally insulating the muffler or other parts of the exhaust system, insulating exhaust system components can prevent heat transfer therefrom and raise the temperature of the exhaust gases therein. Attempts have also been made to install thermal shielding on temperature-sensitive components. Thermal shields, however, add weight and cost to the snowmobile. Accordingly, a need has arisen for improved muffler assemblies for snowmobiles that may be tightly packed with temperature-sensitive components and that reduce the temperature of the forward internal compartment.

SUMMARY

In a first aspect, the present disclosure is directed to an exhaust system for a snowmobile, the exhaust system including a muffler housing, the bottom end of the muffler housing including a muffler exhaust outlet configured to emit exhaust. The exhaust system includes a muffler housing cover spaced from the muffler housing to define an airflow channel therebetween, the muffler housing cover forming a bottom opening. The exhaust system also includes a gas combiner at least partially surrounding the muffler exhaust outlet on the bottom end of the muffler housing and extending through the bottom opening of the muffler housing cover. The gas combiner receives air from the airflow channel and the exhaust from the muffler exhaust outlet to emit a combined air-exhaust stream.

In some embodiments, the muffler housing cover may include a downwardly extending lip forming the bottom opening. In certain embodiments, the muffler housing may have a sidewall between the top end and the bottom end of the muffler housing. In such embodiments, the muffler housing cover may have a bottom wall spaced from the bottom end of the muffler housing and a sidewall spaced from the sidewall of the muffler housing such that air moves through the airflow channel along the sidewall and the bottom end of the muffler housing. In some embodiments, the muffler housing cover sidewall may cover at least half of the muffler housing sidewall. In certain embodiments, the top end of the muffler housing cover sidewall may be spaced from the muffler housing sidewall to define an air inlet of the airflow channel. In some embodiments, a reduced pressure region may be formed proximate the gas combiner in response to the emission of exhaust from the muffler exhaust outlet. In such embodiments, the reduced pressure region may pull air through the airflow channel into the gas combiner, thereby transferring heat away from the muffler housing. In certain embodiments, the gas combiner may at least partially define one or more air passages, the gas combiner receiving air from the airflow channel via the one or more air passages. In some embodiments, the one or more air passages may be partially defined on a proximal end of the gas combiner. In such embodiments, the one or more air passages may be further defined by the bottom end of the muffler housing.

In certain embodiments, the diameter of the gas combiner may be greater than the diameter of the muffler exhaust outlet. In some embodiments, the proximal end of the gas combiner may be coupled to the bottom end of the muffler housing. In certain embodiments, the muffler exhaust outlet may have a length X and the gas combiner may have a length Y such that X<Y. In some embodiments, the distance between the bottom end of the muffler housing and the distal end of the gas combiner may be greater than the distance between the bottom end of the muffler housing and the distal end of the muffler exhaust outlet. In certain embodiments, the distance between the bottom end of the muffler housing and the distal end of the gas combiner may be greater than the distance between the bottom end of the muffler housing and the bottom end of the muffler housing cover. In some embodiments, the muffler exhaust outlet and the gas combiner may each have a generally cylindrical shape. In certain embodiments, the muffler exhaust outlet and the gas combiner may be coaxial.

In a second aspect, the present disclosure is directed to a snowmobile including a chassis having a forward frame assembly and an exhaust system including a muffler assembly coupled to the forward frame assembly. The muffler assembly includes a muffler housing, the bottom end of the muffler housing including a muffler exhaust outlet configured to emit exhaust. The muffler assembly includes a muffler housing cover spaced from the muffler housing to define an airflow channel therebetween, the muffler housing cover forming a bottom opening. The muffler assembly also includes a gas combiner at least partially surrounding the muffler exhaust outlet on the bottom end of the muffler housing and extending through the bottom opening of the muffler housing cover. The gas combiner receives air from the airflow channel and the exhaust from the muffler exhaust outlet to emit a combined air-exhaust stream.

In some embodiments, the snowmobile may include exterior body panels at least partially covering the forward frame assembly to form a forward internal compartment, and the exterior body panels may define one or more air inlets. In such embodiments, the airflow channel may receive air from the one or more air inlets via the forward internal compartment. In certain embodiments, the muffler housing may have a sidewall between the top end and the bottom end of the muffler housing, and the muffler assembly may include spacers interposed between the muffler housing cover and the sidewall of the muffler housing to reinforce the airflow channel therebetween. In some embodiments, the muffler housing may have a sidewall between the top end and the bottom end of the muffler housing, and the muffler assembly may include first and second attachment brackets coupled to the sidewall of the muffler housing. In such embodiments, the muffler housing cover may include first and second muffler housing cover halves coupled to the first and second attachment brackets to form the muffler housing cover. In certain embodiments, the first attachment bracket may be a forward attachment bracket coupled a forward surface of the muffler housing sidewall and the second attachment bracket may be an aft attachment bracket coupled to an aft surface of the muffler housing sidewall. In such embodiments, forward ends of the muffler housing cover halves may be coupled to the forward attachment bracket and aft ends of the muffler housing cover halves may be coupled to the aft attachment bracket such that the first muffler housing cover half is an inboard muffler housing cover half disposed inboard of the muffler housing and the second muffler housing cover half is an outboard muffler housing cover half disposed outboard of the muffler housing.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3D are various views of a muffler assembly for a snowmobile in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
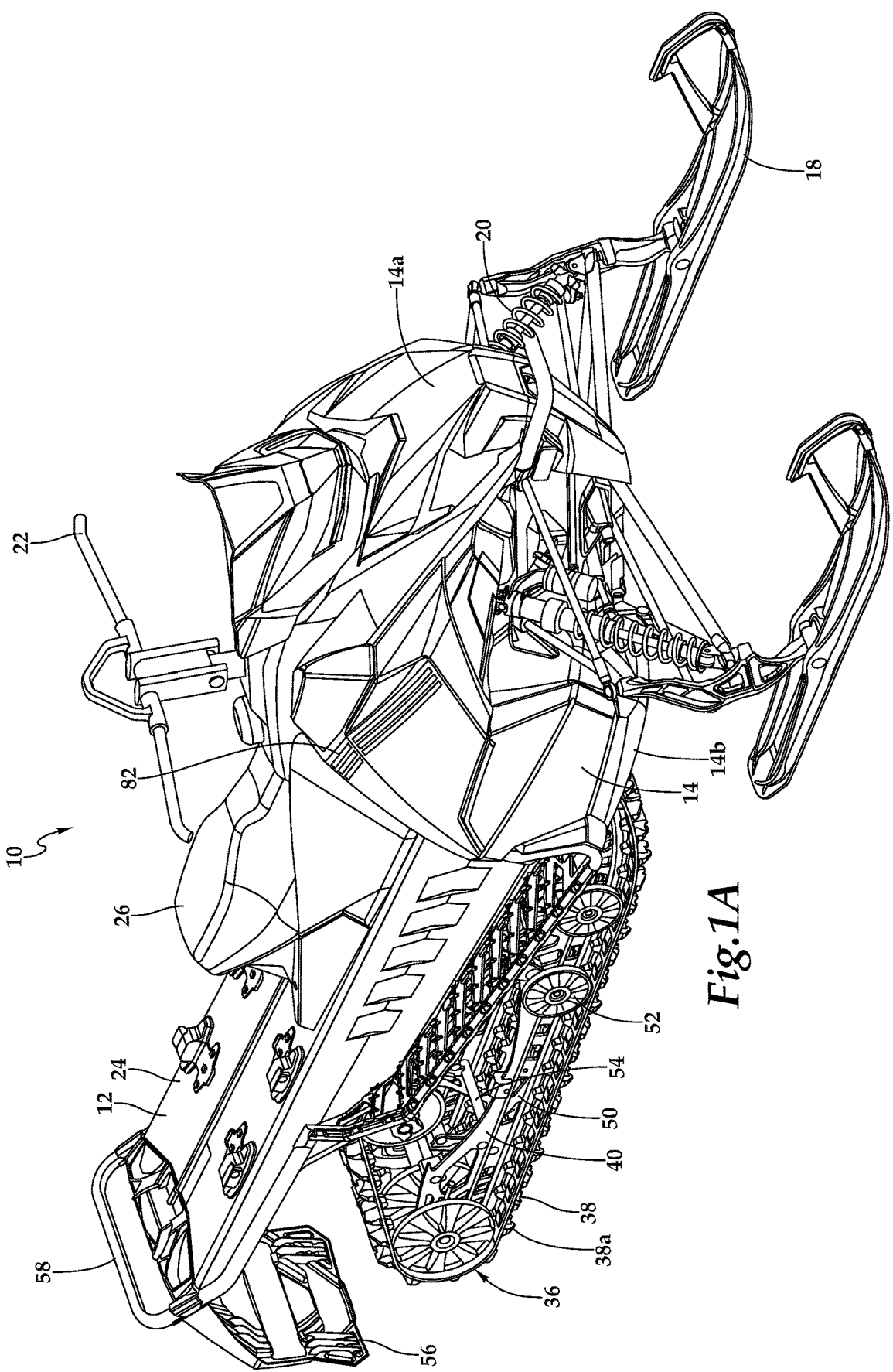
FIGS. 1A-1C are schematic illustrations of a snowmobile having a muffler assembly in accordance with embodiments of the present disclosure.
Figure 1B:
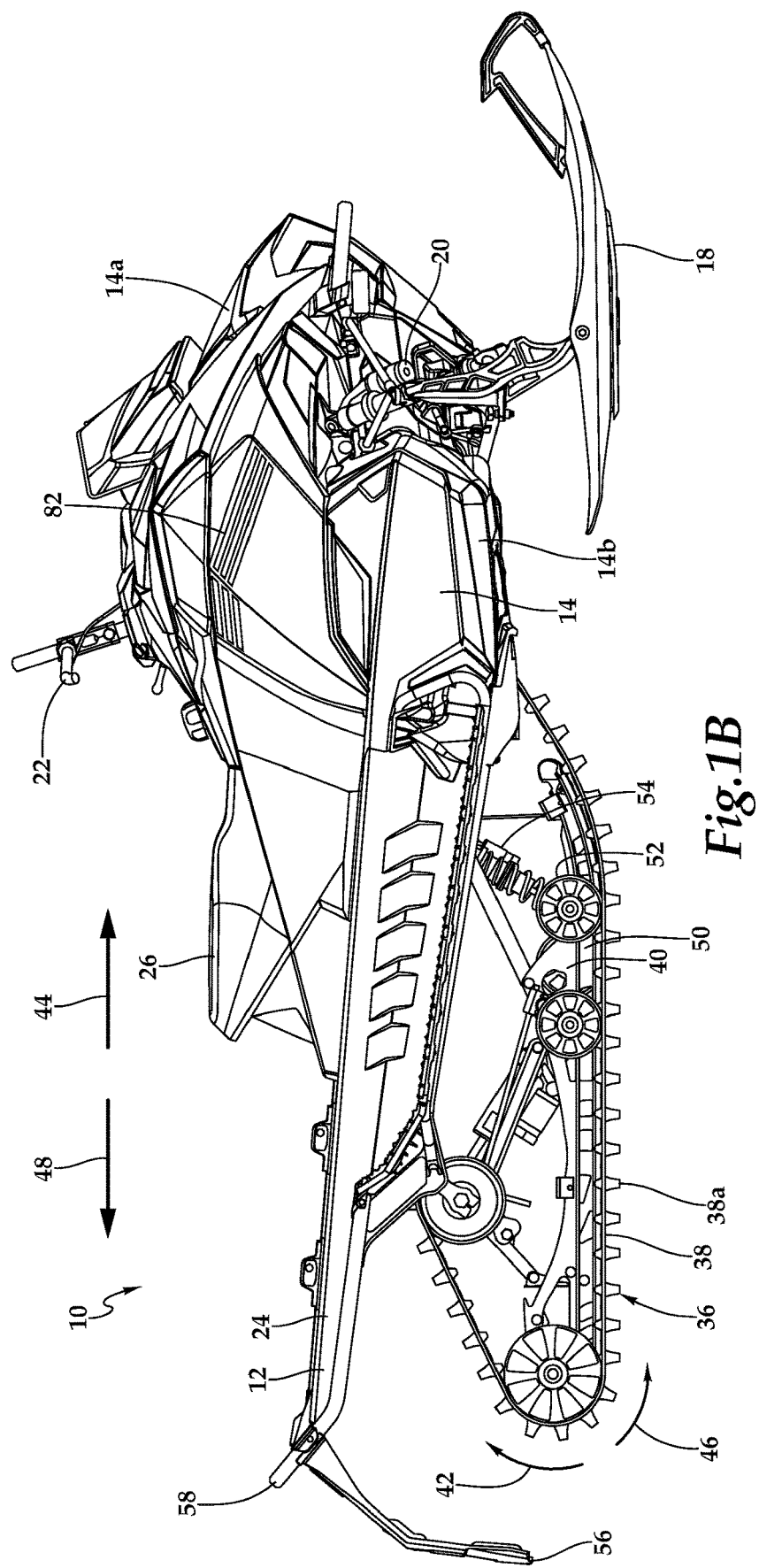
Figure 1C:
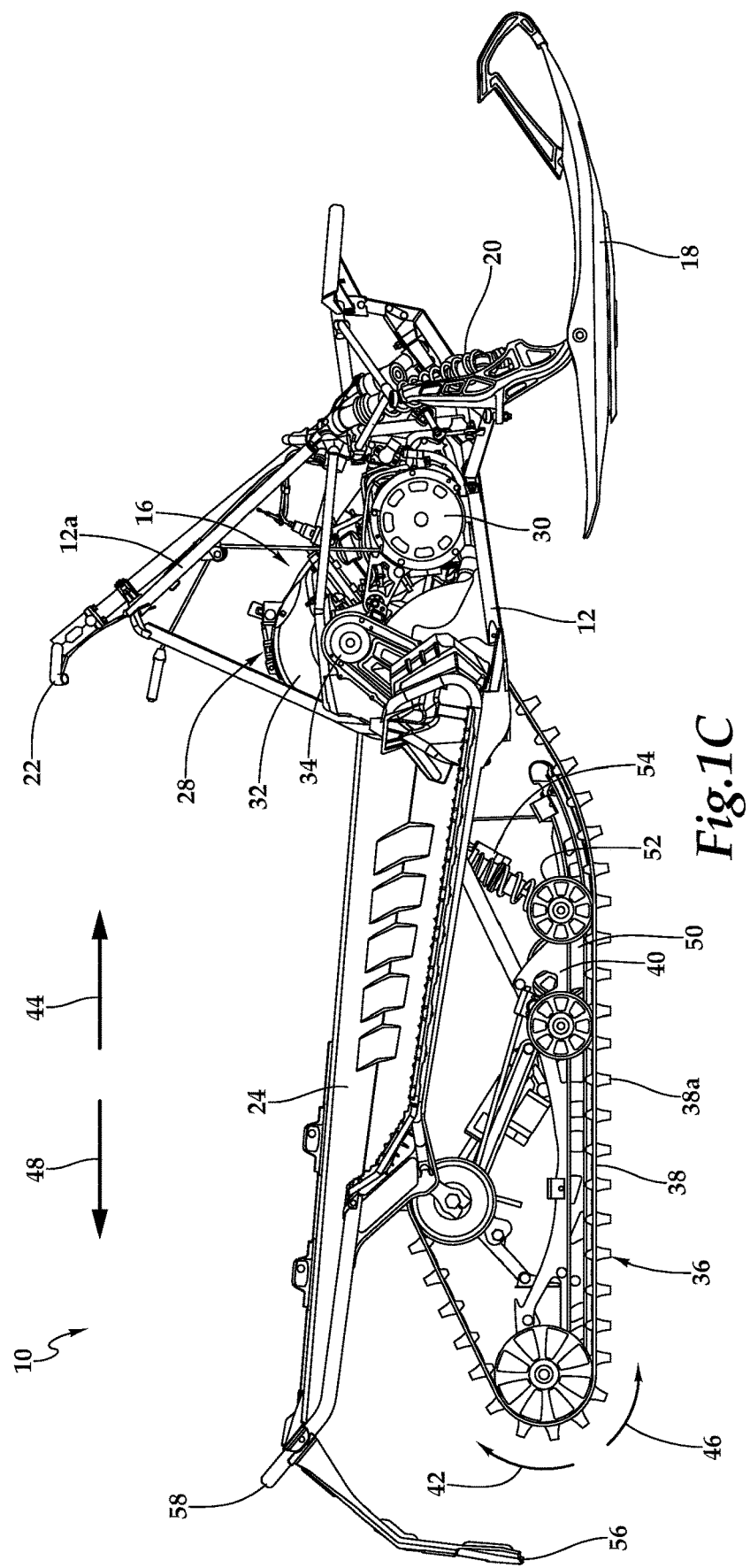

Referring to FIGS. 1A-1C in the drawings, a land vehicle depicted as a snowmobile is schematically illustrated and generally designated 10. Structural support for snowmobile 10 is provided by chassis 12, on or around which the various components of snowmobile 10 are assembled. Chassis 12 includes a forward frame assembly 12a formed from interconnected tube members. One or more exterior body panels 14 cover and protect the various components of snowmobile 10 including parts of chassis 12. For example, front exterior body panel 14a shields underlying componentry from snow and shields the operator of snowmobile 10 from oncoming terrain and cold air during operation. Exterior body panels 14 may also include a skid plate 14b to protect underlying componentry from ground contact. Exterior body panels 14 fully or partially cover forward frame assembly 12*a* to enclose a forward internal compartment 16 in which various snowmobile systems are disposed. Exterior body panels 14 have been removed in FIG. 1C to illustrate forward internal compartment 16 and certain underlying components of snowmobile 10. Skis 18 and a front suspension assembly 20 provide front end support for snowmobile 10. Skis 18 are interconnected to handlebar 22, which is used by an operator to steer snowmobile 10 in a leftward or rightward direction. When handlebar 22 is rotated, skis 18 responsively pivot to turn snowmobile 10. A tunnel 24 is part of chassis 12 and extends in an aft direction from forward frame assembly 12*a*. The operator controls snowmobile 10 from a seat 26 atop tunnel 24 and behind handlebar 22.

A powertrain 28 including an engine 30, a continuously variable transmission 32 and a belt drive assembly 34 is coupled to forward frame assembly 12*a* of chassis 12. Powertrain 28 substantially resides in forward internal compartment 16 and is supported by forward frame assembly 12*a*. Engine 30 may be a two-stroke engine, a four-stroke engine or other engine type. Engine 30 may be naturally aspirated or include a power adder such as a belt-driven or gear-driven supercharger or a turbocharger. Engine 30 may be fuel injected or include a carburetor. Transmission types other than a continuously variable transmission may alternatively be used to control the rotational energy provided by powertrain 28. In some implementations, rotational energy may be generated by powertrain 28 without continuously variable transmission 32.

A drive track system 36 partially disposed within tunnel 24 is in contact with the ground to provide ground propulsion for snowmobile 10. Drive track system 36 includes a drive track 38 with cleats 38*a* supported by a track frame 40. Drive track 38 rotates around track frame 40 in either direction 42 to propel snowmobile 10 in a forward direction 44 in a forward mode or direction 46 to propel snowmobile 10 in a backward direction 48 in a reverse mode. Track frame 40 may be coupled to chassis 12 via a swing arm having a coil spring, a rigid strut, a torsion spring, an elastomeric member or any other suitable coupling configuration. Powertrain 28 provides rotational energy to rotate drive track 38 around track frame 40. Track frame 40 includes a pair of laterally-spaced slide rails 50 to maintain a portion of drive track 38 in contact with the ground. In other embodiments, track frame 40 may include only a single slide rail or more than two slide rails. The undersides of slide rails 50 may include low-friction wear strips in contact with the inside of drive track 38 to facilitate the movement of drive track 38 between slide rails 50 and the ground. Idler wheels 52 are rotatably coupled to slide rails 50 and guide the movement of drive track 38 around track frame 40 at bends and other locations along the path of travel of drive track 38. Slide rails 50 are coupled to tunnel 24 via an internal suspension assembly 54 including shock absorbers to absorb sudden movements or shocks felt by slide rails 50 and thereby enhance the comfort of an operator riding snowmobile 10. A rear flap 56 deflects snow emitted by drive track 38. A lift handle 58 may be used to lift the aft end of snowmobile 10.

Figure 2:
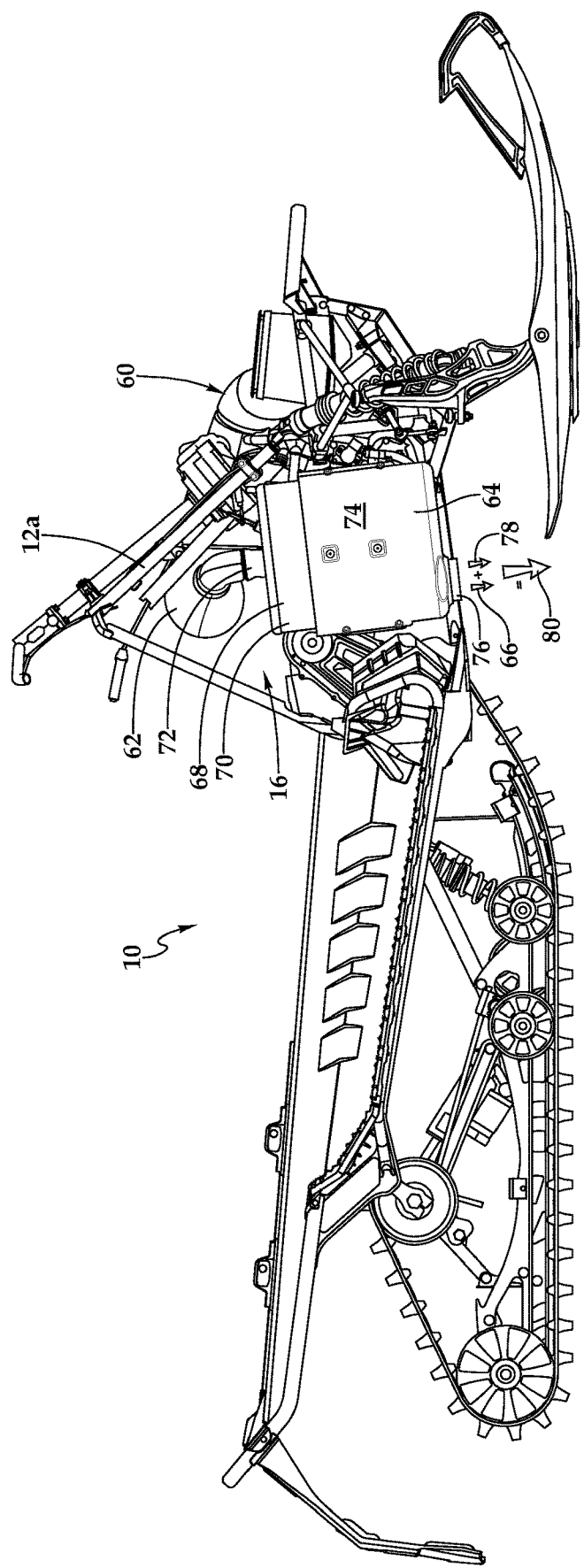
FIG. 2 is a side view of a snowmobile showing an exhaust system having a muffler assembly in accordance with embodiments of the present disclosure.

Referring additionally to FIG. 2 in the drawings, exterior body panels 14 have been removed from snowmobile 10 to illustrate exhaust system 60 including exhaust conduit 62 and muffler assembly 64 coupled to forward frame assembly 12*a*. Exhaust system 60 routes high-temperature exhaust 66 from engine 30 out of forward internal compartment 16. Mufflers in current snowmobiles reach high operating temperatures as a result of the engine exhaust flowing therethrough, which can drastically increase the temperature of the forward internal compartment of the snowmobile. In current snowmobiles, the various systems in the forward internal compartment are often densely packed to reduce the size and improve the aerodynamics and handling of the snowmobile. Temperature-sensitive components near the muffler in the forward internal compartment such as plastic or electrical components may be negatively impacted by the high temperature of the muffler. Spacing such temperature-sensitive components farther from the muffler requires a larger forward internal compartment, which adversely affects the aerodynamics and handling of the snowmobile. While attempts have been made to reduce the temperature of the forward internal compartment by thermally insulating the muffler or other parts of the exhaust system, insulating exhaust system components can prevent heat transfer therefrom and raise the temperature of the exhaust gases therein. Attempts have also been made to install thermal shielding on temperature-sensitive components. Thermal shields, however, add weight and cost to the snowmobile.

Snowmobile 10 includes muffler assembly 64 to address these and other drawbacks of mufflers in current land-based vehicles. Muffler assembly 64 includes a muffler 68 having a muffler housing 70. A muffler exhaust inlet 72 is coupled to the top end of muffler housing 70 to receive exhaust from engine 30 via exhaust conduit 62. Exhaust exits from muffler assembly 64 via a muffler exhaust outlet (not shown) coupled to the bottom end of muffler housing 70. In some embodiments, exhaust 66 may exit forward internal compartment 16 via an opening in skid plate 14*b* and/or a belly pan. In the illustrated embodiment, muffler assembly 64 is located on the starboard side of forward frame assembly 12*a*, although muffler assembly 64 may alternatively be located elsewhere on snowmobile 10. While muffler exhaust inlet 72 and the muffler exhaust outlet are located on the top and bottom ends of muffler housing 70, respectively, in other embodiments muffler exhaust inlet 72 and the muffler exhaust outlet may be located on any side of muffler housing 70 such as the forward, aft, inboard or outboard side of muffler housing 70 depending on the configuration of snowmobile 10 as well as other factors.

Muffler assembly 64 includes a muffler housing cover 74 surrounding a lower portion of muffler housing 70. Muffler housing cover 74 is spaced from muffler housing 70 to define an airflow channel therebetween. A gas combiner 76 partially or fully surrounds the muffler exhaust outlet on the bottom end of muffler housing 70. Exhaust 66, which may exit muffler housing 70 at high velocity, creates a reduced pressure region proximate gas combiner 76 that pulls air 78 from forward internal compartment 16 into the airflow channel between muffler housing 70 and muffler housing cover 74. Gas combiner 76 receives exhaust 66 from the muffler exhaust outlet and air 78 from the airflow channel between muffler housing 70 and muffler housing cover 74 to emit a combined air-exhaust stream 80. Thus, exhaust 66 exiting the muffler exhaust outlet induces airflow across the outer surface of muffler housing 70 during operation of snowmobile 10 to transfer heat away from muffler 68 and also to extract heat from forward internal compartment 16. Fresh air may enter forward internal compartment 16 via air inlets 82 formed in exterior body panels 14 such that the airflow channel between muffler housing 70 and muffler housing cover 74 receives air from air inlets 82 via forward internal compartment 16. The extraction of heat from forward internal compartment 16 and muffler 68 also lowers the temperature of components adjacent to muffler assembly 64.

The heat reduction capabilities of muffler assembly 64 benefit snowmobile 10 across a wide range of driving scenarios such high track speed and/or low ground speed driving scenarios.

It should be appreciated that snowmobile 10 is merely illustrative of a variety of vehicles that can implement the embodiments disclosed herein. Indeed, muffler assembly 64 may be implemented on any ground-based vehicle. Other vehicle implementations can include motorcycles, snow bikes, all-terrain vehicles (ATVs), utility vehicles, recreational vehicles, scooters, automobiles, mopeds, straddle-type vehicles and the like. As such, those skilled in the art will recognize that muffler assembly 64 can be integrated into a variety of vehicle configurations. It should be appreciated that even though ground-based vehicles are particularly well-suited to implement the embodiments of the present disclosure, airborne vehicles and devices such as aircraft can also implement the embodiments.

Figure 3D:
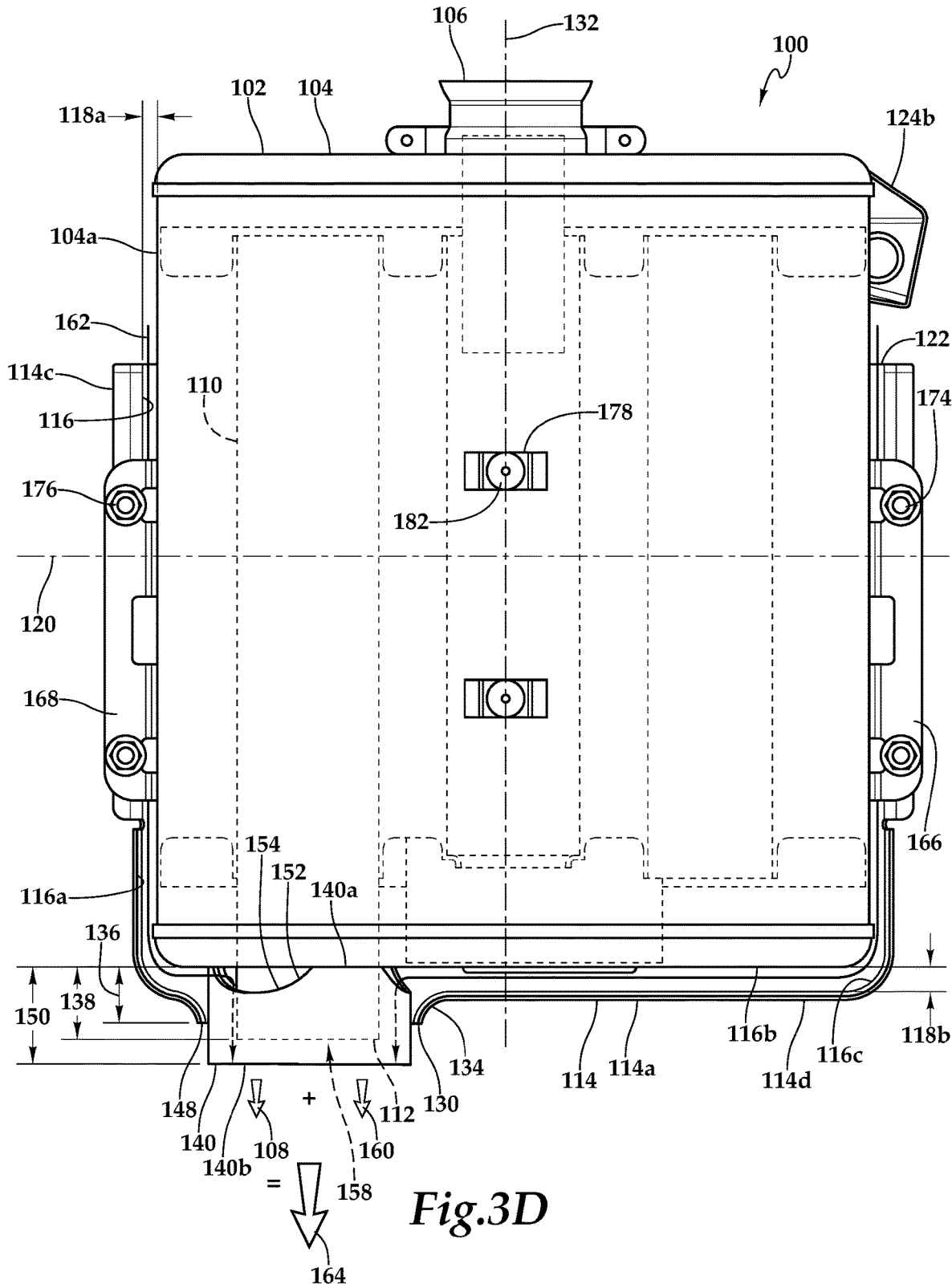

Referring to FIGS. 3A-3D in the drawings, a muffler assembly for a snowmobile is schematically illustrated and generally designated 100. FIG. 3A illustrates the outboard side of muffler assembly 100, FIG. 3B illustrates the inboard side of muffler assembly 100 and FIG. 3C illustrates the bottom side of muffler assembly 100. Muffler assembly 100 includes muffler 102 with muffler housing 104, the top end of which includes muffler exhaust inlet 106 for receiving exhaust 108 from the engine of the snowmobile. Muffler housing 104 includes a sidewall 104a between the top and bottom ends thereof. In the illustrated embodiment, muffler housing 104 has a generally elliptical, or oblong, cylinder shape, although muffler housing 104 may have any shape in the illustrative embodiments. The inside of muffler 102 may include perforated tubes 110, glass wool packing and/or other components for reducing exhaust emission noise. Exhaust 108 is emitted from muffler 102 at a muffler exhaust outlet 112 coupled to the bottom end of muffler housing 104. Muffler exhaust outlet 112 is a conduit having a generally cylindrical shape, although muffler exhaust outlet 112 may have any cross-sectional shape such as a polygonal, elliptical or irregular shape.

Muffler assembly 100 includes muffler housing cover 114 formed from inboard and outboard muffler housing cover halves 114a, 114b surrounding and spaced from a portion of muffler housing 104 to define airflow channel 116 therebetween. Airflow channel 116 wraps around the outer surface portion of muffler housing 104 that is covered by muffler housing cover 114. FIG. 3D is a side view of muffler assembly 100 with outboard muffler housing cover half 114b removed to better illustrate the configuration and operation of underlying components. Muffler housing cover 114 has a generally elliptical, or oblong, cylinder shape to contour the shape of muffler housing 104. Muffler housing cover 114 includes a sidewall 114c spaced from muffler housing sidewall 104a to define a side segment 116a of airflow channel 116 and a bottom wall 114d spaced from the bottom end of muffler housing 104 to define a bottom segment 116b of airflow channel 116. In some embodiments, airflow channel 116 may have a uniform width. For example, width 118a of side segment 116a of airflow channel 116 may be the same as width 118b of bottom segment 116b of airflow channel 116. In other embodiments, airflow channel 116 may have a nonuniform width. For example, width 118a of side segment 116a of airflow channel 116 may be less than width 118b of bottom segment 116b of airflow channel 116, or vice versa. Width 118a of side segment 116a of airflow channel 116 and/or width 118b of bottom segment 116b of airflow channel 116 may be in a range between approximately two millimeters and fifteen millimeters such as a range between six millimeters and nine millimeters. Airflow channel 116 is also partially defined by corner segment 116c, which connects side and bottom segments 116a, 116b of airflow channel 116. In the illustrated embodiment, muffler housing cover 114 covers more than half of the outer surface area of muffler housing 104. Muffler housing cover sidewall 114c extends upward from the edges of muffler housing cover bottom wall 114d and past elevational centerline 120 of muffler housing 104, thereby covering more than half of muffler housing sidewall 104a. The illustrated embodiment exposes the portion of muffler housing 104 that covers the internal section of muffler 102 above perforated tubes 110 to the forward internal compartment of the snowmobile, which may provide a cooling benefit in operation. The vertical length of muffler housing cover sidewall 114c, and therefore the outer surface area of muffler housing 104 covered by muffler housing cover 114, may vary in the illustrative embodiments.

The top end of muffler housing cover sidewall 114c is spaced from muffler housing sidewall 104a to define an air inlet 122 of airflow channel 116. Air inlet 122 receives air from the forward internal compartment of the snowmobile such as forward internal compartment 16 shown in FIGS. 1C and 1D. After entering air inlet 122, air moves through side segment 116a of airflow channel 116 along muffler housing sidewall 104a, then through corner segment 116c of airflow channel 116 along the bottom corner of muffler housing 104 and then through bottom segment 116b of airflow channel 116 along the bottom end of muffler housing 104. Although the top end of muffler housing cover sidewall 114c partially defines a single air inlet 122 to airflow channel 116, any portion of muffler housing cover 114 may define any number of air inlets to airflow channel 116.

Muffler assembly 100 includes muffler assembly mounts 124a, 124b, 124c welded or otherwise coupled to muffler housing 104. Muffler assembly mounts 124a, 124b, 124c secure muffler assembly 100 directly or indirectly to the forward frame assembly of the snowmobile such as forward frame assembly 12a of snowmobile 10 in FIGS. 1C and 2. Muffler assembly mounts 124a, 124b are positioned proximate the top end of muffler housing 104 above air inlet 122 and the top end of muffler housing cover 114. Muffler assembly mount 124a is coupled proximate muffler exhaust inlet 106 and muffler assembly mount 124b is coupled proximate the forward end of muffler housing sidewall 104a. Muffler assembly mounts 124a, 124b may include a fastening projection such as a stud or threaded body for removably securing muffler assembly 100 to the forward frame assembly of the snowmobile. Muffler assembly mount 124c is coupled to a lower portion of muffler housing sidewall 104a and extends through a mount opening 126 defined by muffler housing cover 114. The edges or region of muffler housing cover 114 defining mount opening 126 may or may not be sealed to the underlying muffler housing sidewall 104a depending on desired airflow characteristics. Muffler assembly mount 124c may include an aperture 128 located outside of muffler housing cover 114 that receives a fastener to removably secure muffler assembly mount 124c to the forward frame assembly of the snowmobile. In some embodiments, muffler housing 104 may be directly secured to the forward frame assembly of the snowmobile using muffler assembly mounts 124a, 124b, 124c while muffler housing cover 114 is indirectly secured to the forward frame assembly of the snowmobile by virtue of being directly secured to only muffler housing 104 and/or other components of muffler assembly 100. It will be appreciated by one of ordinary skill in the art that muffler assembly 100 may be secured to any portion of the snowmobile using a wide variety of mounts or fasteners including or not including muffler assembly mounts 124a, 124b, 124c.

Bottom wall 114d of muffler housing cover 114 forms a bottom opening 130. In the illustrated embodiment, bottom opening 130 is located aft of fore-aft centerline 132 of muffler housing 104, although in other embodiments bottom opening 130 may be located proximate or forward of fore-aft centerline 132. Bottom wall 114d of muffler housing cover 114 includes a downwardly extending lip 134 that defines bottom opening 130. As best seen in FIG. 3D, lip 134 has a curved cross-sectional profile to facilitate airflow in a downward direction. Distance 136 between the bottom end of muffler housing 104 and the bottom end of muffler housing cover 114, in particular the bottom edge of lip 134, is less than distance 138 between the bottom end of muffler housing 104 and the bottom end of muffler exhaust outlet 112 such that muffler exhaust outlet 112 extends past the bottom edge of lip 134. Distance 138 may be considered to be the length of the portion of muffler exhaust outlet 112 external to muffler housing 104. In other embodiments, distance 136 between the bottom end of muffler housing 104 and the bottom edge of lip 134 may be greater than distance 138 between the bottom end of muffler housing 104 and the bottom end of muffler exhaust outlet 112.

Figure 4A:
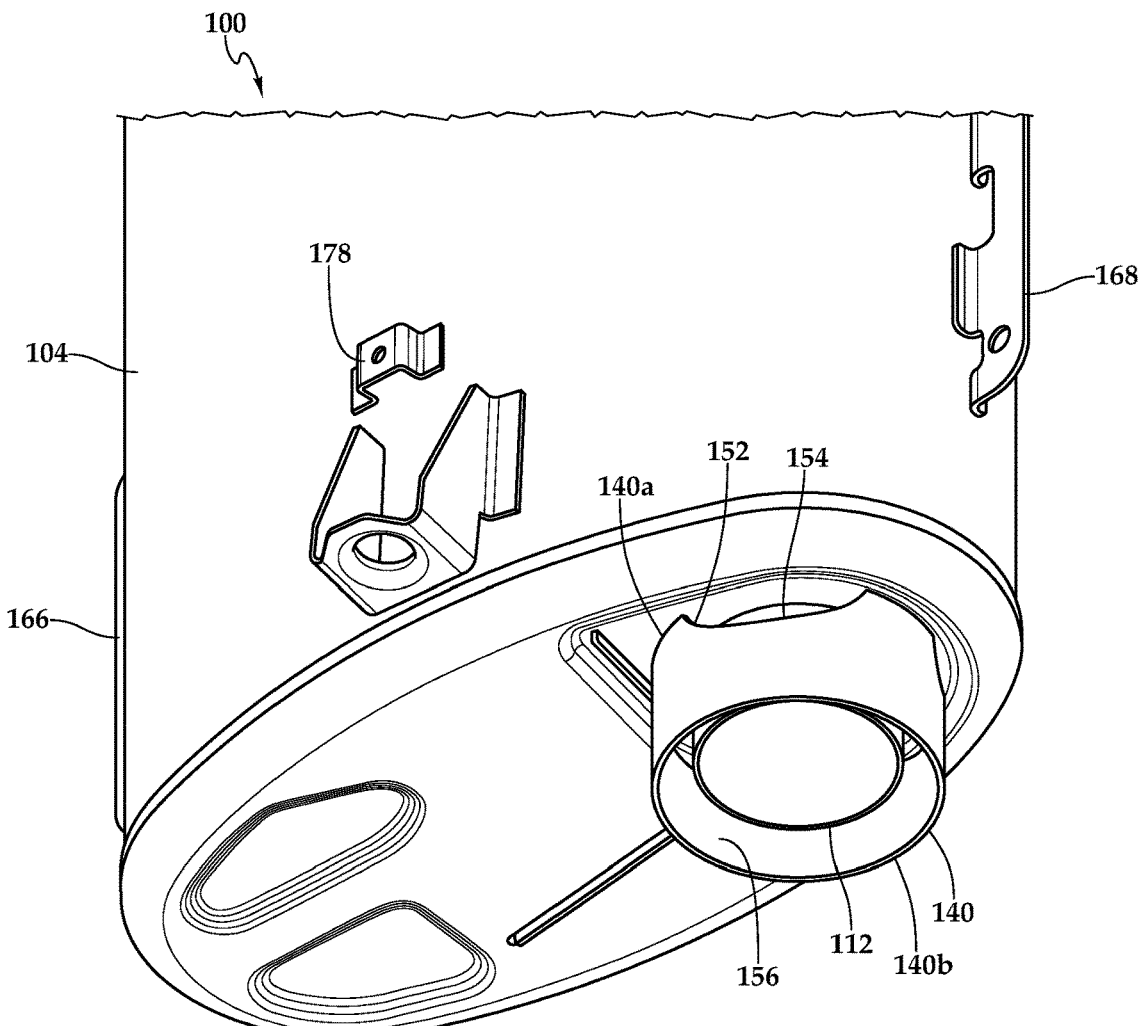
FIGS. 4A-4B are isometric views of a gas combiner for a muffler assembly in accordance with embodiments of the present disclosure.
Figure 4B:
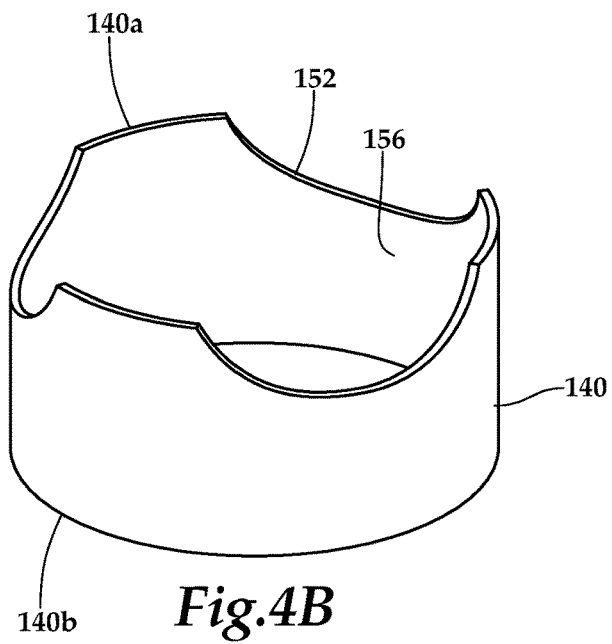

Referring additionally to FIGS. 4A-4B in the drawings, muffler assembly 100 includes a gas combiner 140 surrounding muffler exhaust outlet 112 on the bottom end of muffler housing 104. FIG. 4A is an isometric view of muffler assembly 100 without muffler housing cover 114 to better illustrate gas combiner 140. Gas combiner 140 is a conduit having a generally cylindrical shape, although gas combiner 140 may have any cross-sectional shape such as a polygonal, elliptical or irregular shape. As best seen in FIG. 3C, muffler exhaust outlet 112 and gas combiner 140 are coaxial. In other embodiments, muffler exhaust outlet 112 and gas combiner 140 may be non-coaxial. Diameter 142 of gas combiner 140 is greater than diameter 144 of muffler exhaust outlet 112, thus allowing gas combiner 140 to surround muffler exhaust outlet 112. Diameter 146 of bottom opening 130 is greater than diameter 142 of gas combiner 140 to define an annular gap 148 therebetween. In the illustrated embodiment, lip 134 is not directly coupled to the outer surface of gas combiner 140, thereby defining gap 148. In other embodiments, lip 134 may be pressed, crimped, sealed or fixedly secured against the outer surface of gas combiner 140 to form a tighter fit between muffler housing cover 114 and gas combiner 140.

Proximal end 140a of gas combiner 140 is coupled to the bottom end of muffler housing 104 using a weld, a press fit, fasteners or other fastening technique. Distal end 140b of gas combiner 140 extends through and beyond bottom opening 130 including lip 134 of muffler housing cover 114, exposing the lower portion of gas combiner 140 external to muffler housing cover 114. Distal end 140b of gas combiner 140 extends beyond bottom opening 130 such that distance 150 between the bottom end of muffler housing 104 and distal end 140b of gas combiner 140 is greater than distance 136 between the bottom end of muffler housing 104 and the bottom end of muffler housing cover 114. Gas combiner 140 is longer than muffler exhaust outlet 112 such that distance 150 between the bottom end of muffler housing 104 and distal end 140b of gas combiner 140 is greater than distance 138 between the bottom end of muffler housing 104 and the bottom end of muffler exhaust outlet 112. Gas combiner 140 has a crown shape in which proximal end 140a has curved cutouts 152 that partially define air passages 154. When gas combiner 140 is positioned against the bottom end of muffler housing 104, air passages 154 are further defined by the bottom end of muffler housing 104. While cutouts 152 are shown as having a curved profile, cutouts 152 may alternatively have an angular, triangular, polygonal or irregular profile. Air passages 154 provide fluid communication between airflow channel 116 and interior 156 of gas combiner 140.

In operation, the emission of exhaust 108 from muffler exhaust outlet 112 forms a reduced pressure region 158 proximate interior 156 of gas combiner 140. Reduced pressure region 158 may also extend beyond distal end 140b of gas combiner 140. The suction created by reduced pressure region 158 pulls air 160 from the forward internal compartment of the snowmobile, into air inlet 122 and through airflow channel 116 as indicated by airflow path 162 in FIG. 3D. As air 160 flows along airflow channel 116 from air inlet 122 toward bottom opening 130 of muffler housing cover 114, air 160 flows across much of the outer surface of muffler housing 104, thereby extracting heat from muffler 102. Gas combiner 140 receives air 160 from airflow channel 116 via air passages 154 that mixes with exhaust 108 from muffler exhaust outlet 112 to form a combined air-exhaust stream 164 that is routed away from muffler assembly 100. In pulling air 160 through airflow channel 116 and into gas combiner 140, reduced pressure region 158 created by the emission of exhaust 108 transfers heat out of the forward internal compartment of the snowmobile and away from muffler housing 104. As a result of gas combiner 140 extending beyond the distal end of muffler exhaust outlet 112, gas combiner 140 may collect more exhaust 108 exiting muffler exhaust outlet 112, create a stronger reduced pressure region 158 and also act as a deflector to shield muffler exhaust outlet 112 from snow or other debris. Thus, the length of gas combiner 140 may vary depending on desired performance characteristics. The illustrative embodiments of muffler assembly 100 allow muffler assembly 100 to be more closely packaged with temperature-sensitive components in the forward internal compartment of the snowmobile. Muffler assembly 100 also allows muffler 102 to operate at higher temperatures without negatively impacting spacing with respect to temperature-sensitive components in the forward internal compartment of the snowmobile. Thus, muffler assembly 100 allows the exterior body panels and forward internal compartment of the snowmobile to be more compactly packaged, thereby improving the aerodynamics and handling of the snowmobile. Because gas combiner 140 can act as a deflector for muffler exhaust outlet 112, a separate dedicated deflector for this purpose may be eliminated to reduce the weight and cost of the snowmobile.

Figure 5:
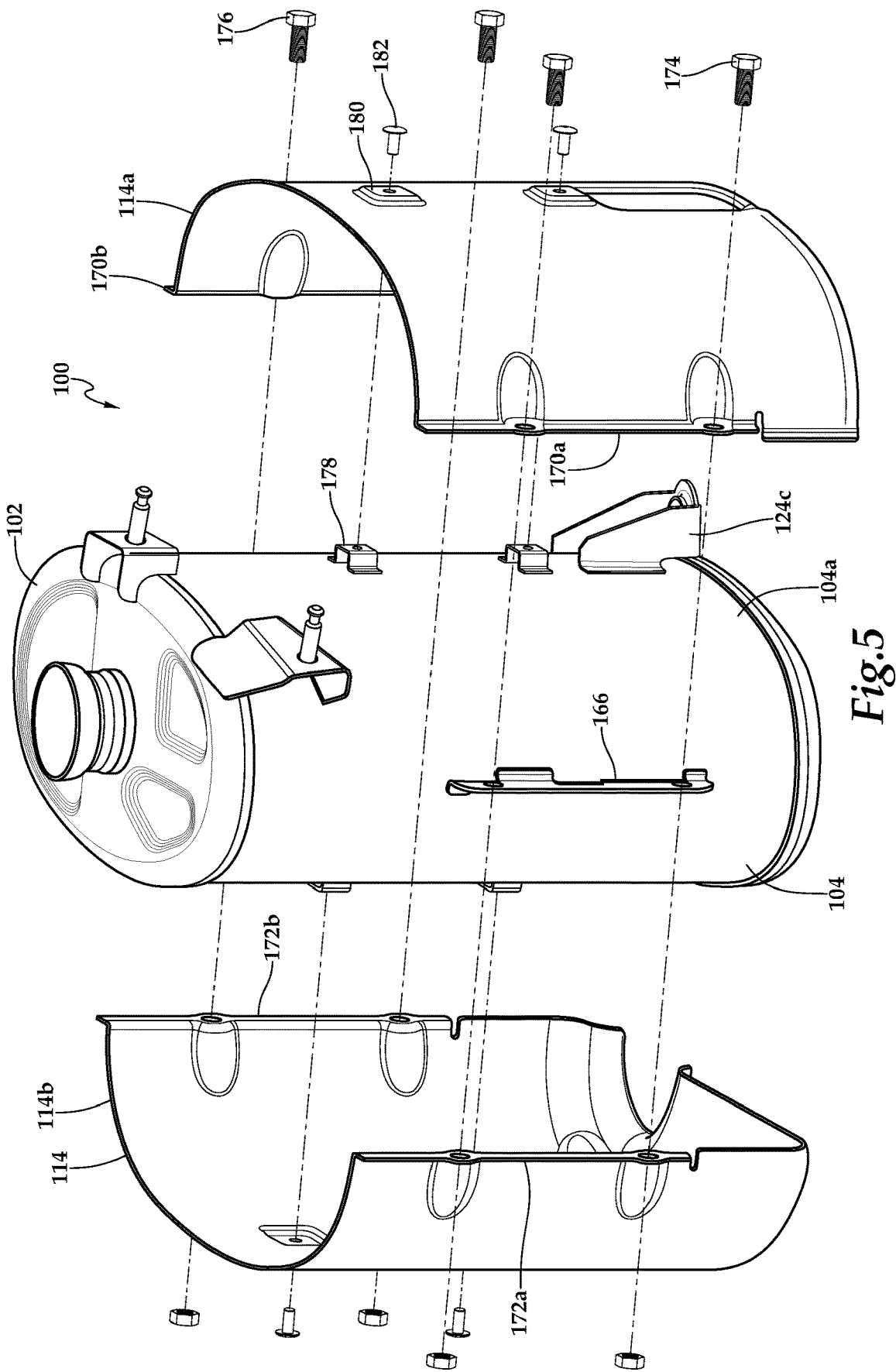
FIG. 5 is an exploded view of a muffler assembly for a snowmobile in accordance with embodiments of the present disclosure.

Referring additionally to FIG. 5 in the drawings, an exploded view of muffler assembly 100 shows muffler 102 including muffler housing 104 and muffler housing cover 114 including inboard and outboard muffler housing cover halves 114a, 114b. A forward attachment bracket 166 is coupled to a forward surface of muffler housing sidewall 104a and an aft attachment bracket 168 is coupled to an aft surface of muffler housing sidewall 104a. The forward end of inboard muffler housing cover half 114a includes attachment flange 170a and the aft end of inboard muffler housing cover half 114a includes attachment flange 170b. The forward end of outboard muffler housing cover half 114b includes attachment flange 172a and the aft end of outboard muffler housing cover half 114b includes attachment flange 172b. Forward attachment flanges 170a, 172a extend in a forward direction and aft attachment flanges 170b, 172b extend in an aft direction. Apertures on forward attachment flanges 170a, 172a are aligned with apertures on forward attachment bracket 166 and removably coupled thereto using fasteners 174. Apertures on aft attachment flanges 170b, 172b are aligned with apertures on aft attachment bracket 168 and removably coupled thereto using fasteners 176. Securing muffler housing cover 114 to attachment brackets 166, 168 outward of muffler housing 104 provides spacing between muffler housing cover 114 and muffler housing 104 to define airflow channel 116. While muffler housing cover 114 includes two shell pieces, in the illustrated embodiment, muffler housing cover 114 may be formed from any number of pieces such as one, three, four or more pieces and may be attached to muffler housing 104 using any number of attachment brackets.

Muffler assembly 100 includes spacers 178 interposed between muffler housing sidewall 104a and muffler housing cover 114. Spacers 178 reinforce airflow channel 116 by maintaining the gap between muffler housing sidewall 104a and muffler housing cover 114. Spacers 178 may be welded or otherwise coupled to muffler housing sidewall 104a and extend outward from muffler housing 104 to provide a surface for engaging the inner surfaces of inboard and outboard muffler housing cover halves 114a, 114b. Specifically, muffler housing cover 114 forms indentations 180 for receiving the outer surface of spacers 178 to facilitate positioning of muffler housing cover 114 with respect to muffler housing 104. Spacers 178 and indentations 180 define apertures for receiving removable fasteners 182 to secure muffler housing cover 114 to spacers 178. Muffler assembly mount 124c may be positioned underneath spacers 178 to maintain the dimensions of airflow channel 116 in the region where muffler housing 104 is secured to the forward frame assembly of the snowmobile. Muffler assembly 100 may be a multi-material assembly. For example, muffler housing 104 may be formed from steel such as stainless steel or 400 series stainless steel. In some embodiments, muffler housing cover 114 may be formed from a lighter weight material than muffler housing 104 such as aluminum, aluminum alloy, magnesium, magnesium alloy or a polymer. In certain embodiments, muffler assembly mounts 124a, 124b, 124c and spacers 178 may be formed from steel such as stainless steel or 400 series stainless steel.

Figure 6B:
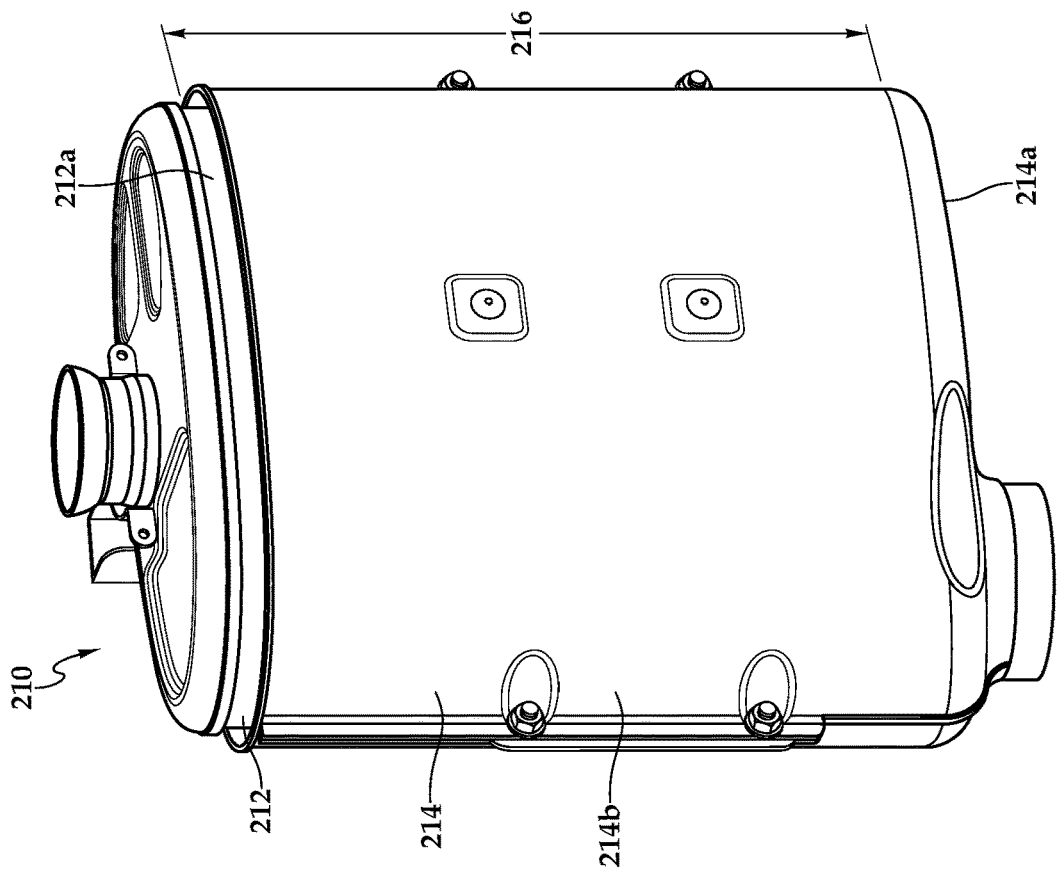
FIGS. 6A-6B are isometric views of muffler assemblies having muffler housing covers with different heights in accordance with embodiments of the present disclosure.
Figure 6A:
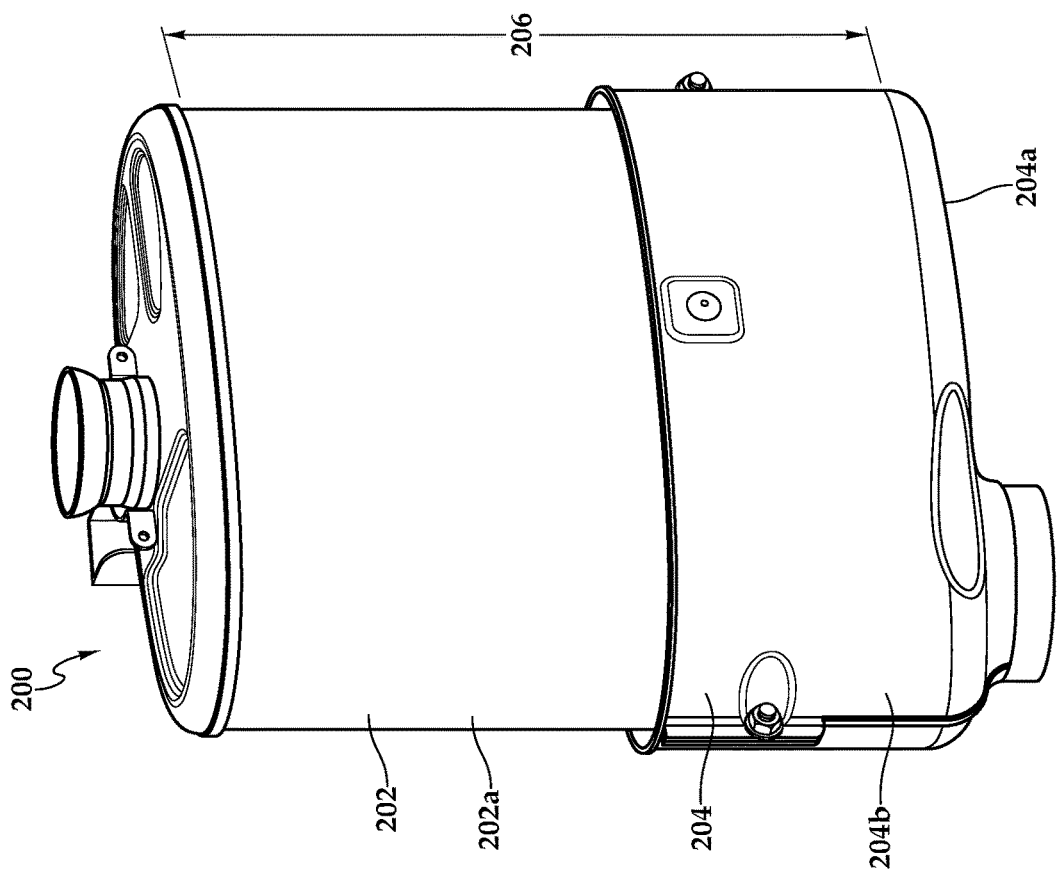

Referring to FIGS. 6A-6B in the drawings, muffler assemblies having different muffler housing covers are schematically illustrated. In FIG. 6A, muffler assembly 200 includes muffler housing 202 including muffler housing sidewall 202a and muffler housing cover 204 spaced from muffler housing 202 to form an airflow channel therebetween. Muffler housing cover 204 includes bottom wall 204a and sidewall 204b. Muffler housing cover sidewall 204b extends upward from muffler housing cover bottom wall 204a about one-third of length 206 of muffler housing sidewall 202a, thereby exposing a larger portion of muffler housing 202 to the forward internal compartment of the snowmobile and reducing the length of the airflow channel between muffler housing 202 and muffler housing cover 204. A shorter muffler housing cover 204 may be useful to conserve space in the forward internal compartment of the snowmobile or when less airflow along the outer surface of muffler housing 202 is desired.

In FIG. 6B, muffler assembly 210 includes muffler housing 212 including muffler housing sidewall 212a and muffler housing cover 214 spaced from muffler housing 212 to form an airflow channel therebetween. Muffler housing cover 214 includes bottom wall 214a and sidewall 214b. Muffler housing cover sidewall 214b extends upward from muffler housing cover bottom wall 214a between 90 percent and 100 percent of length 216 of muffler housing sidewall 212a, thereby exposing less of muffler housing 212 to the forward internal compartment of the snowmobile and increasing the length of the airflow channel between muffler housing 212 and muffler housing cover 214. A longer muffler housing cover 214 may be useful when additional airflow along the outer surface of muffler housing 212 is desired. It will be appreciated by one of ordinary skill in the art that muffler housing cover sidewall 214b may have any length with respect to length 216 of muffler housing sidewall 212a. For example, muffler housing cover sidewall 214b may extend upward from muffler housing cover bottom wall 214a about one-eight, one-fourth, one-half, two-thirds, three-fourths or more of length 216 of muffler housing sidewall 212a. In other embodiments, muffler housing cover 214 may include only muffler housing cover bottom wall 214a and exclude muffler housing cover sidewall 214b.

Figure 7A:
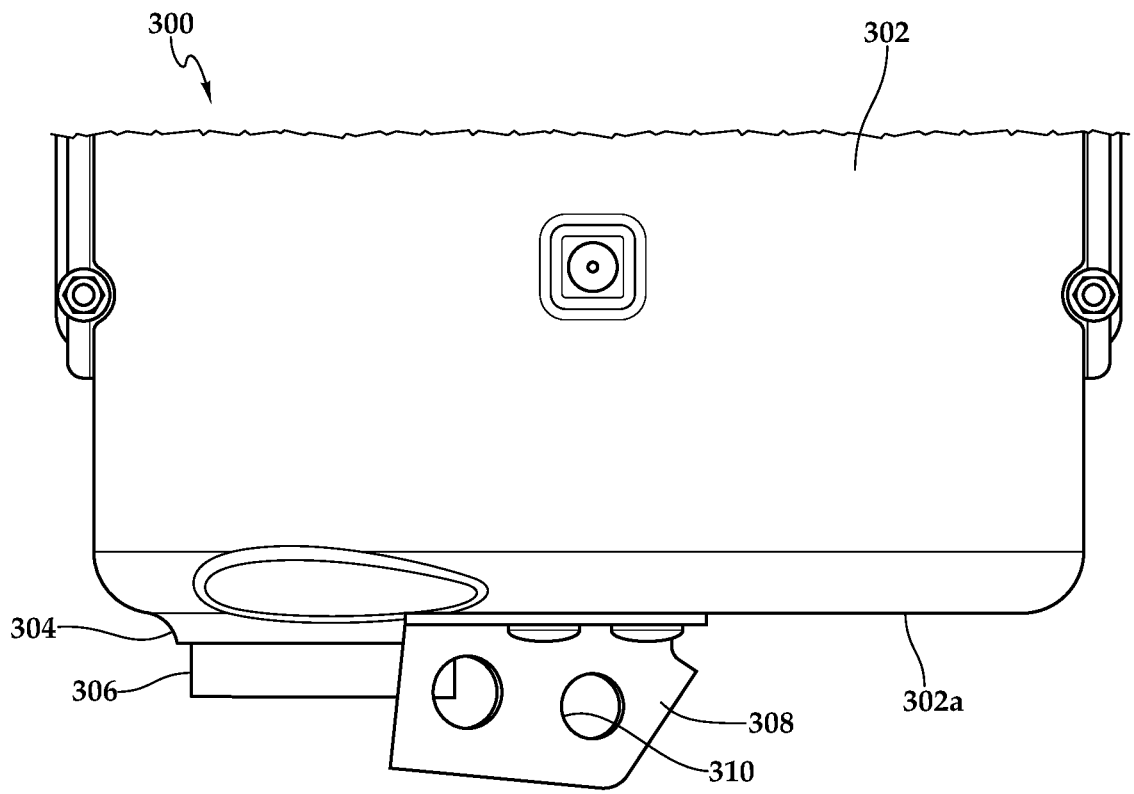
FIGS. 7A-7B are side views of muffler assemblies including different deflectors in accordance with embodiments of the present disclosure.
Figure 7B:
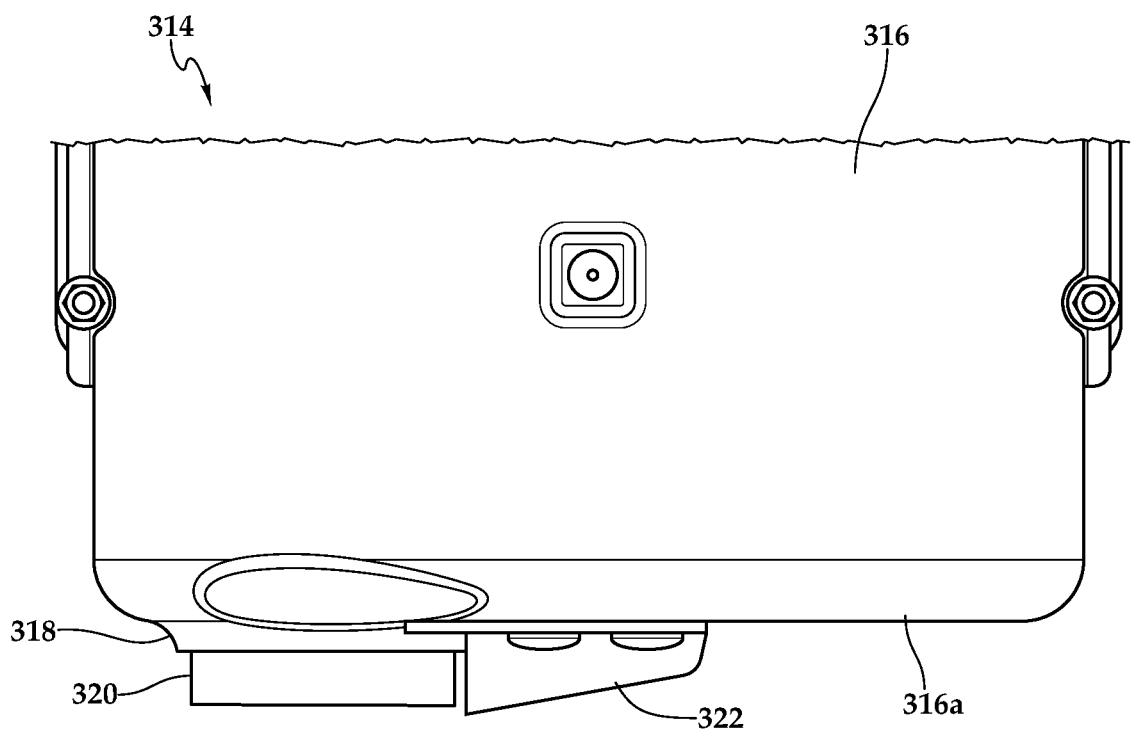

Referring to FIGS. 7A-7B in the drawings, muffler assemblies having different deflectors are schematically illustrated. In FIG. 7A, a lower portion of muffler assembly 300 is shown including muffler housing cover 302 defining bottom opening 304 and gas combiner 306 extending from bottom opening 304. Deflector 308 is coupled to bottom wall 302a of muffler housing cover 302 at least partially forward of gas combiner 306. The aft end of deflector 308 overlaps with gas combiner 306. Deflector 308 is sized to extend below gas combiner 306 and defines apertures 310 to provide a desired balance between preventing snow and debris from interfering with exhaust emission and allowing air to pass through deflector 308. In FIG. 7B, a lower portion of muffler assembly 314 is shown including muffler housing cover 316 defining bottom opening 318 and gas combiner 320 extending from bottom opening 318. Deflector 322 is coupled to bottom wall 316a of muffler housing cover 316 forward of gas combiner 320. Deflector 322 does not define any apertures. The bottom edge of deflector 322 extends downward about as far as gas combiner 320, providing a different balance than deflector 308 between preventing snow and debris from interfering with exhaust emission and allowing air to pass around deflector 322. Deflectors of various sizes, shapes and materials are within the scope of the illustrative embodiments. Certain embodiments of the muffler assemblies disclosed herein may exclude a deflector and instead exclusively use gas combiner 320 to shield bottom opening 318 from snow and debris.

Figure 8:
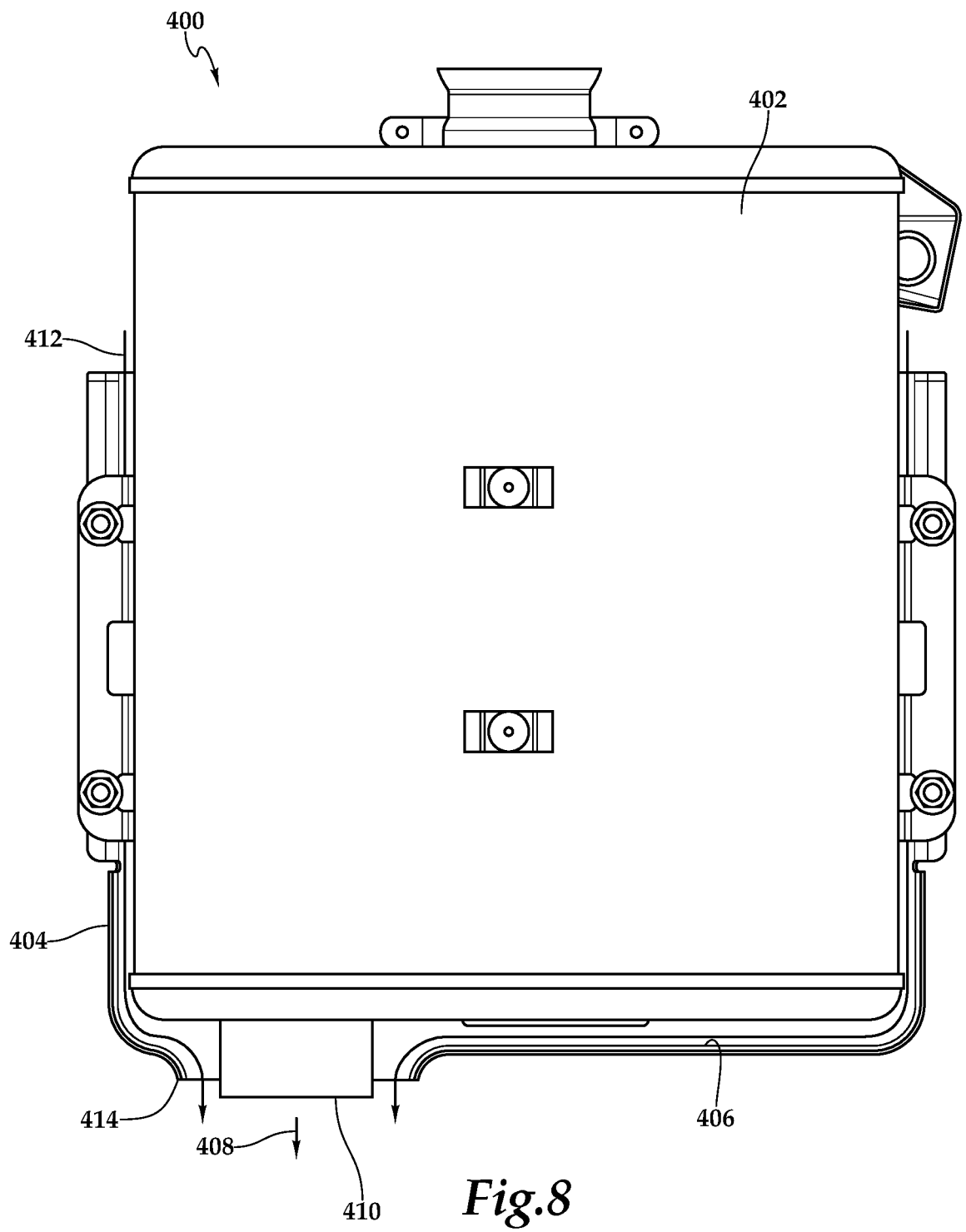
FIG. 8 is a side view of a muffler assembly for a snowmobile in accordance with embodiments of the present disclosure.

Referring to FIG. 8 in the drawings, a muffler assembly is schematically illustrated and generally designated 400. Muffler assembly 400 includes a muffler housing 402 and muffler housing cover 404 spaced from muffler housing 402 to form airflow channel 406 therebetween. As exhaust 408 is emitted from muffler exhaust outlet 410, air is pulled through airflow channel 406 along airflow path 412 out of bottom opening 414 of muffler housing cover 404. Muffler assembly 400 does not include a gas combiner. Thus, air exiting bottom opening 414 mixes with exhaust 408 from muffler exhaust outlet 410 without first passing through a gas combiner. A deflector may be coupled to the bottom wall of muffler housing cover 404 to protect muffler exhaust outlet 410.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A snowmobile comprising:
   a chassis including a forward frame assembly; and
   an exhaust system including a muffler assembly coupled to the forward frame assembly, the muffler assembly comprising:
   a muffler housing having a bottom end, the bottom end of the muffler housing including a muffler exhaust outlet configured to emit exhaust;
   a muffler housing cover spaced from the muffler housing to define an airflow channel therebetween, the muffler housing cover having a downwardly extending lip forming a bottom opening; and
   a gas combiner having a proximal end coupled to the bottom end of the muffler housing, the gas combiner including a plurality of cutouts forming a plurality of air passages with the bottom end of the muffler housing, the gas combiner positioned between the muffler exhaust outlet and the downwardly extending lip of the muffler housing cover;
   wherein, the gas combiner receives air from the airflow channel through the plurality of air passages, receives the exhaust from the muffler exhaust outlet and emits a combined air-exhaust stream.

2. The snowmobile as recited in claim 1 wherein, a reduced pressure region is formed proximate the gas combiner in response to the emission of exhaust from the muffler exhaust outlet, the reduced pressure region pulling air through the airflow channel and the at least one air passage into the gas combiner, thereby transferring heat away from the muffler housing.

3. The snowmobile as recited in claim 1 wherein, the cutouts of the plurality of cutouts are circumferentially distributed about the gas combiner.

4. The snowmobile as recited in claim 1 wherein, the diameter of the gas combiner is greater than the diameter of the muffler exhaust outlet and less than the diameter of the downwardly extending lip of the muffler housing cover.

5. The snowmobile as recited in claim 1 wherein, the gas combiner and the muffler exhaust outlet each has a distal end; and
   wherein, the distance between the bottom end of the muffler housing and the distal end of the gas combiner is greater than the distance between the bottom end of the muffler housing and the distal end of the muffler exhaust outlet.

6. The snowmobile as recited in claim 1 wherein, the gas combiner and the downwardly extending lip of the muffler housing cover each has a distal end; and
   wherein, the distance between the bottom end of the muffler housing and the distal end of the gas combiner is greater than the distance between the bottom end of the muffler housing and the distal end of the downwardly extending lip of the muffler housing cover.

7. The snowmobile as recited in claim 1 wherein, the gas combiner, the muffler exhaust outlet and the downwardly extending lip of the muffler housing cover each has a distal end;
   wherein, the distance between the bottom end of the muffler housing and the distal end of the gas combiner is greater than the distance between the bottom end of the muffler housing and the distal end of the muffler exhaust outlet; and
   wherein, the distance between the bottom end of the muffler housing and the distal end of the gas combiner is greater than the distance between the bottom end of the muffler housing and the distal end of the downwardly extending lip of the muffler housing cover.

8. The snowmobile as recited in claim 1 wherein, the muffler exhaust outlet and the gas combiner each have a generally cylindrical shape.

9. The snowmobile as recited in claim 1 wherein, the muffler exhaust outlet and the gas combiner are coaxial.

10. A snowmobile comprising:
    a chassis including a forward frame assembly; and
    an exhaust system including a muffler assembly coupled to the forward frame assembly, the muffler assembly comprising:
    a muffler housing having a bottom end, a top end and a sidewall between the top end and the bottom end, the bottom end of the muffler housing including a muffler exhaust outlet configured to emit exhaust;
    a muffler housing cover having a bottom wall spaced from the bottom end of the muffler housing and a sidewall spaced from the sidewall of the muffler housing to define an airflow channel therebetween, the muffler housing cover sidewall having a top end that is spaced from the muffler housing sidewall to define an air inlet of the airflow channel, the muffler housing cover forming a bottom opening; and
    a gas combiner having a proximal end coupled to the bottom end of the muffler housing, the gas combiner including a plurality of cutouts forming a plurality of air passages with the bottom end of the muffler housing, the gas combiner at least partially surrounding the muffler exhaust outlet on the bottom end of the muffler housing and extending through the bottom opening of the muffler housing cover, the gas combiner configured to receive air from the airflow channel through the plurality of air passages and the exhaust from the muffler exhaust outlet to emit a combined air-exhaust stream.

11. The snowmobile as recited in claim 10 wherein, a reduced pressure region is formed proximate the gas combiner in response to the emission of exhaust from the muffler exhaust outlet, the reduced pressure region pulling air through the air inlet and the airflow channel into the gas combiner, thereby transferring heat away from the muffler housing.

12. The snowmobile as recited in claim 10 wherein, the muffler housing cover sidewall covers at least half of the muffler housing sidewall.

13. The snowmobile as recited in claim 10 wherein, the muffler housing cover sidewall covers between ninety percent and one hundred percent of the muffler housing sidewall.

14. The snowmobile as recited in claim 10 wherein, the muffler housing cover includes first and second muffler housing cover halves that are coupled to the muffler housing to form the muffler housing cover.

15. A snowmobile comprising:
a chassis including a forward frame assembly; and
an exhaust system including a muffler assembly coupled to the forward frame assembly, the muffler assembly comprising:
a muffler housing having a bottom end, a top end and a sidewall between the top end and the bottom end, the bottom end of the muffler housing including a muffler exhaust outlet configured to emit exhaust;
a muffler housing cover spaced from the muffler housing to define an airflow channel therebetween, the muffler housing cover including inboard and outboard muffler housing cover halves and forming a bottom opening;
a plurality of spacers interposed between the muffler housing cover and the sidewall of the muffler housing to reinforce the airflow channel therebetween, the plurality of spacers including a plurality of inboard spacers that couple the inboard muffler housing cover half to the muffler housing and a plurality of outboard spacers that couple the outboard muffler housing cover half to the muffler housing to form the muffler housing cover; and a gas combiner at least partially surrounding the muffler exhaust outlet on the bottom end of the muffler housing and extending through the bottom opening of the muffler housing cover, the gas combiner configured to receive air from the airflow channel and the exhaust from the muffler exhaust outlet to emit a combined air-exhaust stream.

16. The snowmobile as recited in claim 15 wherein, a reduced pressure region is formed proximate the gas combiner in response to the emission of exhaust from the muffler exhaust outlet, the reduced pressure region pulling air through the airflow channel into the gas combiner, thereby transferring heat away from the muffler housing.

17. The snowmobile as recited in claim 15 wherein, the muffler housing cover is coupled to the muffler housing via the plurality of spacers.

18. The snowmobile as recited in claim 15 further comprising exterior body panels at least partially covering the forward frame assembly to form a forward internal compartment, the exterior body panels defining one or more air inlets; and
wherein, the airflow channel receives air from the one or more air inlets via the forward internal compartment.

* * * * *